Figure 1:
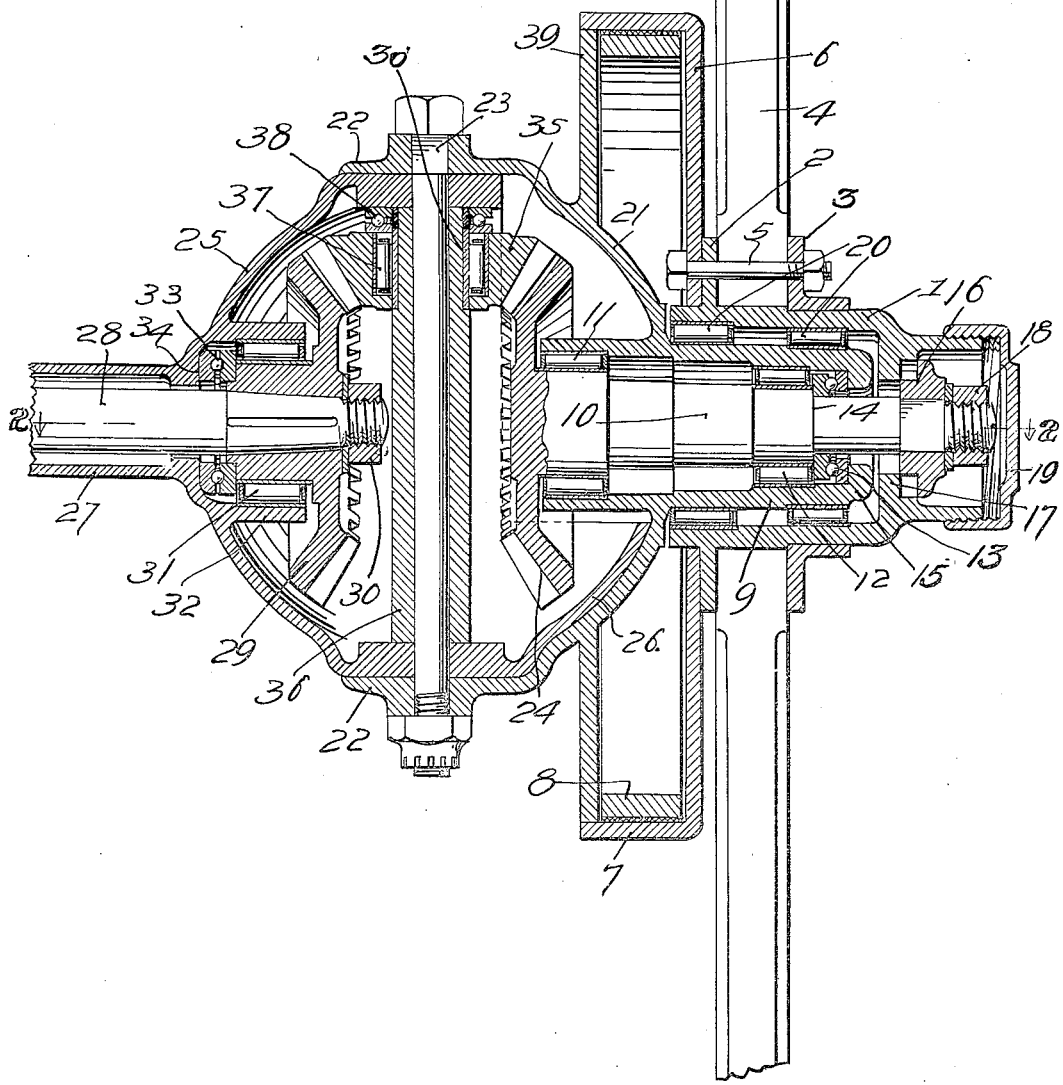

M. H. BARD.
GEARING FOR MOTOR VEHICLES.
APPLICATION FILED MAY 25, 1916.

1,230,454.

Patented June 19, 1917.
2 SHEETS—SHEET 1.

Witnesses

M. H. Bard,
Inventor by

Attorneys

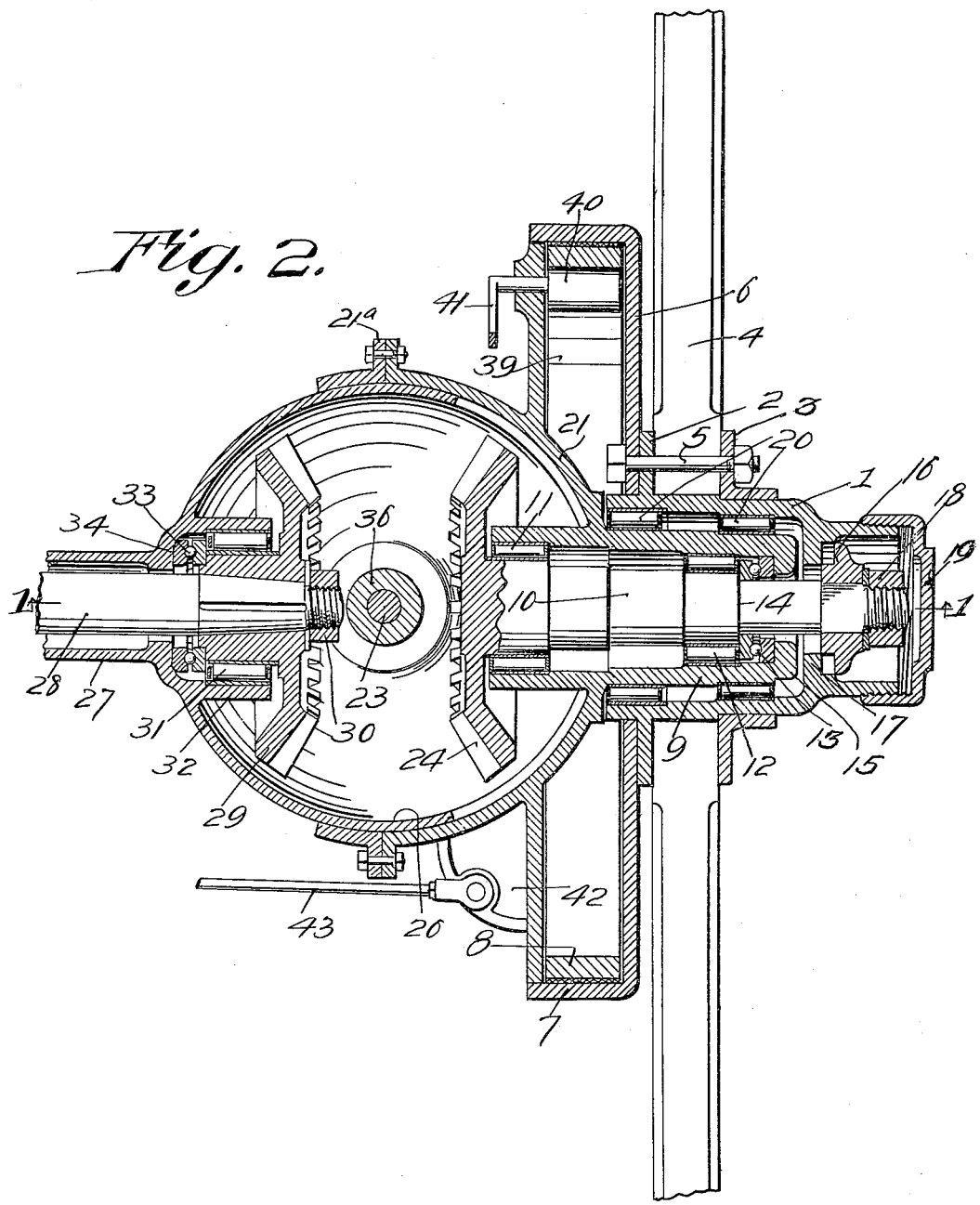

UNITED STATES PATENT OFFICE.

MILTON H. BARD, OF JOHNSTOWN, PENNSYLVANIA.

GEARING FOR MOTOR-VEHICLES.

1,230,454.

Specification of Letters Patent.

Patented June 19, 1917.

Application filed May 25, 1916. Serial No. 99,852.

*To all whom it may concern:*

Be it known that I, MILTON H. BARD, a citizen of the United States, residing at Johnstown, in the county of Cambria and State of Pennsylvania, have invented a new and useful Gearing for Motor-Vehicles, of which the following is a specification.

The present invention appertains to gearing for motor vehicles, and aims to provide novel and improved means for mounting the wheel of a vehicle whereby it can be angled for purpose of steering the vehicle, and means for transmitting power to said wheel to rotate it.
The present invention can be used for each wheel of an automobile, or can be used for the front steering wheels only, whichever is desired, and where used, permits the wheel to be angled for purpose of steering, and also enables said wheel to be driven by the engine to assist in propelling the vehicle.

It is the object of the invention to provide a mechanism of the character described embodying a unique assemblage of the component elements, whereby to enhance the utility and efficiency of the device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—
Figure 1 is a vertical section of the invention taken on the line 1—1 of Fig. 2.

Fig. 2 is a horizontal section taken on the line 2—2 of Fig. 1.

The wheel embodies a hub 1 having an outstanding flange 2, and an annular plate 3 is mounted upon the hub 1, while the spokes 4 have their inner ends disposed between the flange 2 and plate 3 and clamped therebetween by means of bolts 5 or other securing elements engaging through said flange and plate. A plate or disk 6 is secured against the inner side of the flange 2 by the same bolts 5 which secure the spokes in place, and is provided around its margin with an annular rim 7 providing a brake drum within which is mounted an expansible brake 8, which when expanded frictionally engages the rim 7 to retard the rotation of the wheel.

Disposed or projecting within the hub 1 is a bearing sleeve 9 in which is mounted for rotation a spindle 10. Anti-frictional rollers 11 and 12 are disposed between the spindle 10 and sleeve 9 whereby said spindle can rotate with little friction. A thrust bearing 13, embodying annular ball races and anti-frictional balls therebetween, is disposed between a shoulder 14 of the spindle 10, and an inturned annular lip 15 at the outer end of the sleeve 9, whereby the outward thrust of the spindle 10 will not create an objectionable friction. Mounted upon the spindle 10 adjacent its outer end is a collar 16 engaged with an inturned annular flange or portion 17 of the hub 1 spaced slightly outward from the lip 15, and said collar 16 is held in place upon the spindle by a nut 18 threaded upon the end of the spindle. Thus, the hub 1 is held in place upon the spindle and sleeve 9, and since the flange 17 bears against the collar 16 while the lip 15 bears against the thrust bearing 13, the hub 1, sleeve 9 and spindle 10 cannot be separated when the collar 16 and nut 18 are in place. A hub cap 19 is preferably screwed or otherwise engaged upon the outer end of the hub 1, to exclude dirt from the bearings. The sleeve 9 acts as a journal for the hub 1, since the hub is mounted for rotation upon the sleeve, and anti-frictional rollers 20 are preferably disposed between the sleeve 9 and hub 1 to reduce friction to a minimum.

The sleeve 9 is provided adjacent the inner end of the hub 1 with an approximately hemi-spherical housing section 21 having the upper and lower portions 22 through which a vertical bolt or spindle 23 is engaged, serving as the pivot or joint about which the spindle 10 can be swung for angling the wheel for purpose of steering. The section 21 is divided at 21ª.

Coöperating with the housing section 21 is a somewhat similarly shaped housing section 25 fitting within the marginal portion of the section 21, and providing with said section 21 a housing or casing to inclose the gears, to protect them from moisture, dirt and other foreign matter. The housing sections 21 and 25 fit snugly together, as seen in Fig. 2, and the lower portion of the section 25 is in the form of a bowl 26 for containing lubricant in which certain of the gears dip to keep them lubricated as well as the other movable parts. The upper and lower portions of the housing section 25 embrace the bolt or spindle 23 adjacent the portions 22, to provide a hinge connection between the two housing sections, whereby the section 21 and accompanying parts can swing about a vertical axis. The housing section 25 is formed integral with the respective end of the axle housing 27 in which the axle or axle shaft 28 is mounted for rotation. The respective end of the axle shaft 28 projects into the housing section 25.

Keyed upon the end of the axle shaft 28 which projects within the gear housing, is a bevel gear 29 held in place by means of a nut 30 or other securing element engaged upon the end of the shaft 28. Disposed between the hub of the gear 29 and a flange or collar 32 projecting from the section 25 around the hub of said gear, is an annular series of anti-frictional rollers 31, whereby to mount the shaft 28 and gear 29 for free rotation. A thrust bearing 33, similar to the thrust bearing 13, is disposed between the end of the hub of the gear 29 and the shoulder 34 at the juncture of the housing section 25 and axle housing 27. The inner end of the spindle 10 has formed thereon or secured thereto a bevel gear 24 similar to and opposite the gear 29, and the two bevel gears 24 and 29 intermesh with an idler pinion or bevel gear 35 mounted for rotation upon the spindle 23 adjacent its upper end. A sleeve or tubular member 36 is mounted upon the spindle 23 between the upper and lower portions of the section 25, and anti-frictional rollers 37 are disposed between the gear 35 and sleeve 36, while a thrust bearing 38 similar to the thrust bearings above described is disposed between the gear 35 and the upper portion of the section 25.

The housing section 21 is provided with a flat plate or disk 39 fitting within the rim 7 of the plate 6 to inclose the brake.

As above indicated, the housing section 21 can be oscillated about a vertical axis, to move the wheel correspondingly, for purpose of steering, and at any position of the wheel, when the axle shaft 28 rotates, to rotate the gear 29, motion is transmitted to the wheel by way of the gear 35, gear 24, spindle 10 and collar 16 which is interengaged with the flange 17 so that the hub 1 of the wheel rotates with the collar 16. The present mechanism therefore enables the wheel to be angled for purpose of steering, and to be driven from the engine (not shown) which is connected to the shaft 28. This construction can be used for each wheel of an automobile, or for the front steering wheels only, which ever is desired, and suitable means can be employed for angling the wheels for purpose of steering.

The disk or plate 39 carries a cam or other device 40 for expanding the brake 8, and said device 40 has an arm 41 for the attachment of a rod or other connection leading to the brake lever. Opposite the device 40, the plate 39 and housing section 21 have a web 42 therebetween with which a steering rod 43 is pivotally connected, whereby the wheel can be angled for purpose of steering.

Having thus described the invention, what is claimed as new is:

In a device of the character described, an axle housing having an approximately hemispherical housing section at its end, a sleeve having a similar housing section interfitting with the aforesaid section to provide a housing, one section being divided, the lower portion of the other section being in the form of a bowl to hold lubricant, a vertical spindle pivotally connecting said sections for swinging movements, a wheel hub mounted for rotation upon said sleeve, a spindle rotatable within said sleeve and connected to said hub to rotate it, a shaft within the axle housing, bevel gears carried by the adjacent ends of said shaft and second mentioned spindle and arranged to dip in the lubricant in said bowl, and a bevel gear mounted for rotation upon the first mentioned spindle and meshing with the aforesaid gears.

In testimony that I claim the foregoing as my own, I have hereto affixed my signature in the presence of two witnesses.

MILTON H. BARD.

Witnesses:
EDITH MURPHY,
JAMES A. GRAHAM.

Copies of this patent may be obtained for five cents each, by addressing the "Commissioner of Patents, Washington, D. C."